United States Patent
Wang et al.

(10) Patent No.: US 8,788,801 B2
(45) Date of Patent: Jul. 22, 2014

(54) BACKUP AND RECOVERY OF SYSTEMS BY RESTORING A BACKUP BOOT CONFIGURATION DATA (BCD) WITH INSTALLATION FILES FROM AN OPERATING SYSTEM INSTALL DISK

(75) Inventors: Jinqiang Wang, Beijing (CN); Xuan Li, Beijing (CN)

(73) Assignee: CA, Inc., Islandia, NY (US)

( * ) Notice: Subject to any disclaimer, the term of this patent is extended or adjusted under 35 U.S.C. 154(b) by 699 days.

(21) Appl. No.: 12/542,953

(22) Filed: Aug. 18, 2009

(65) Prior Publication Data

US 2011/0047129 A1 Feb. 24, 2011

(51) Int. Cl.
*G06F 1/24* (2006.01)
*G06F 9/00* (2006.01)

(52) U.S. Cl.
USPC ............................................ 713/100; 713/2

(58) Field of Classification Search
CPC ..................................... G06F 1/24; G06F 9/00
USPC .......................................... 713/1, 2; 707/675
See application file for complete search history.

(56) References Cited

U.S. PATENT DOCUMENTS

| | | | | |
|---|---|---|---|---|
| 6,681,323 | B1 * | 1/2004 | Fontanesi et al. ................. | 713/1 |
| 6,820,214 | B1 * | 11/2004 | Cabrera et al. .................. | 714/15 |
| RE40,092 | E * | 2/2008 | Kang ............................... | 713/2 |
| 7,434,042 | B2 * | 10/2008 | Oguma ............................ | 713/2 |
| 7,694,123 | B2 * | 4/2010 | Prasse et al. ..................... | 713/2 |
| 7,966,484 | B1 * | 6/2011 | Deetz et al. ...................... | 713/1 |
| 2003/0126242 | A1 * | 7/2003 | Chang ............................ | 709/222 |
| 2004/0225874 | A1 * | 11/2004 | Burr et al. ........................ | 713/1 |

OTHER PUBLICATIONS

Techarena.in, "How to move BCD Boot manager files in Vista to another partition"; 6 pages, Dated Aug. 25, 2008.*
Multibooters.co.uk,"Dual/Multi Booting with Vista"; 1 page, Dated Feb. 18, 2007.*
Vistaheads.com,"HKEY_LOCAL_MACHINE_BCD00000000", 3 pages, Dated Sep. 12, 2007.*
Digitalsupporttech.com, "Mirroring boot partition in Windows Server 2008", 8 pages, Dated May 6, 2008.*
Smallvoid.com, "Restore boot manager when it is missing or compressed"; 24 pages, Dated Oct. 30, 2007.*
insanelymac.com, "EFI Post Install Script-fully automatized"; 15 pages, Dated Dec. 8, 2008.*

(Continued)

*Primary Examiner* — Thomas Lee
*Assistant Examiner* — Phil Nguyen
(74) *Attorney, Agent, or Firm* — Schwegman, Lundberg & Woessner, P.A.

(57) ABSTRACT

Various embodiments includes at least one of systems, methods, and software for backup and recovery of systems including boot configuration data in an extension firmware interface partition. Generating a backup, in some embodiments, includes copying Boot Configuration Data (BCD) from a registry of an operating system executing on a computer into a file and storing the file. These and other embodiments may include a system restore process that consumes this file. Such a process may operate to identify an Extension Firmware Interface (EFI) hard disk partition on a hard disk of a system to be restored, temporarily assign a drive letter to the identified EFI hard disk partition, and copy files common amongst all installations an operating system to be restored on the system along with BCD data from the BCD file to the EFI hard disk partition according to the assigned drive letter. The system may then be rebooted.

19 Claims, 5 Drawing Sheets

(56) References Cited

OTHER PUBLICATIONS support.microsoft.com, "The Setupldr.efi file cannot read the automated system recovery disk or the Winnt.sif file from a USB floppy drive in Windows Server 2003"; 5 pages, Dated Jul. 24, 2007.*
appassure.com,"protecting and recovering an EFI system"; 14 pages, Dated.*
support.microsoft.com, "How to establish and boot to GPT mirrors on 64-bit Windows"; 10 pages, Dated Mar. 31, 2008.*
http://www.ehow.com/how_12090268_back-up-bcd-store.html, "How to back up the BCD store"; 3 pages, Dated Jan. 15, 2008.*
appassure.com,"protecting and recovering an EFI system"; 14 pages, Dated Jan. 18, 2012.*

* cited by examiner

BACKUP AND RECOVERY OF SYSTEMS BY RESTORING A BACKUP BOOT CONFIGURATION DATA (BCD) WITH INSTALLATION FILES FROM AN OPERATING SYSTEM INSTALL DISK

BACKGROUND INFORMATION

Backing up Microsoft® Windows® Server® 2008 systems presents complex issues. Portions of the Microsoft® Windows® Server® 2008 operating system are held in hard disk partitions that are not accessible while the operating system is running. Thus, conventional backup techniques are insufficient to create system images from which a bare-metal recovery may be performed.

SUMMARY

Various embodiments include at least one of systems, methods, and software for backup and recovery of systems including boot configuration data in an extension firmware interface partition. Generating a backup, in some embodiments, includes copying Boot Configuration Data (BCD) from a registry of an operating system executing on a computer into a file and storing the file. These and other embodiments may include a system restore process that consumes this file. Such a process may operate to identify an Extension Firmware Interface (EFI) hard disk partition on a hard disk of a system to be restored, temporarily assign a drive letter to the identified EFI hard disk partition, and copy files common amongst all installations an operating system to be restored on the system along with BCD data from the BCD file to the EFI hard disk partition according to the assigned drive letter. The system may then be rebooted.

DETAILED DESCRIPTION

Figure 1:
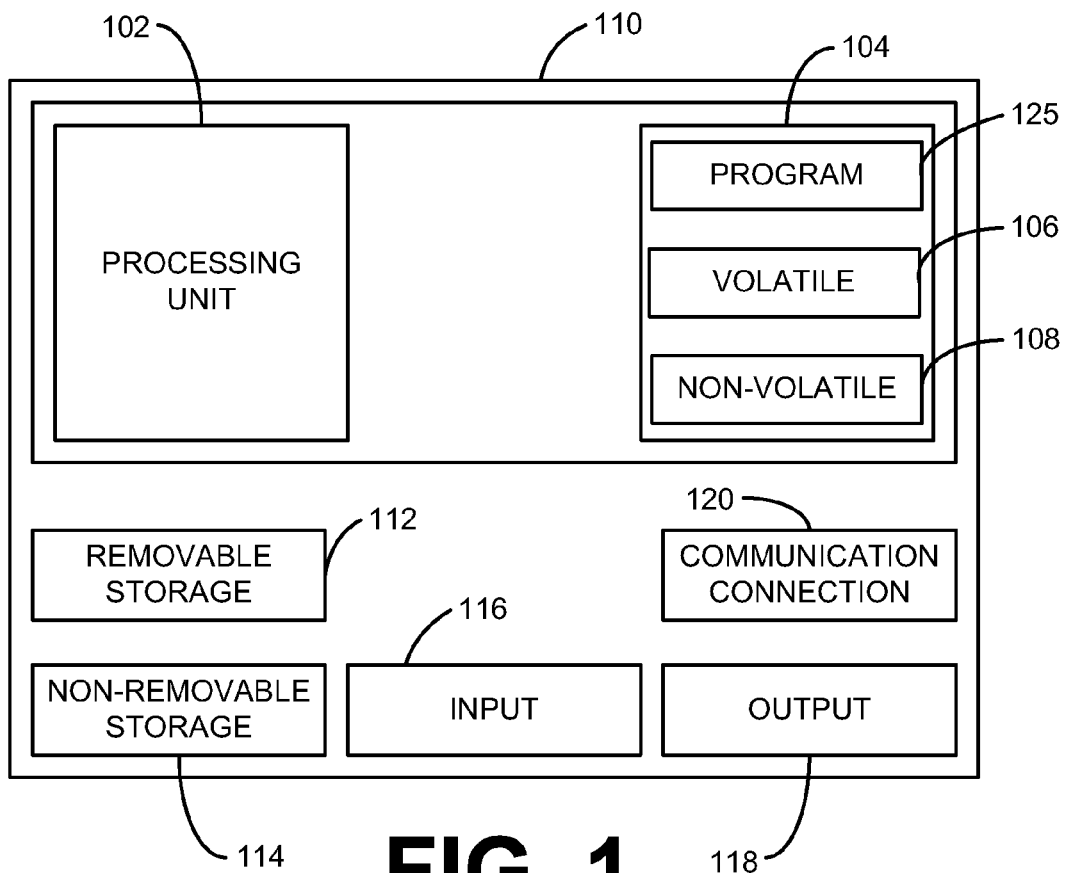
FIG. 1 is a block diagram of a computing device according to an example embodiment.

The Microsoft® Windows® Server® 2008 operating system that executes on the Intel® Itanium® Architecture 64-Bit (IA64) platforms includes an Extension Firmware Interface (EFI) partition on a hard drive that is hidden from the normal operating system environment and cannot be accessed once the operating system is started. Because it is hidden, backup software is typically unable to detect its presence and backup its contents. To back up this partition, backup software performs special operations to connect to this partition and copy the data. During recovery, special operations are also required to restore the data back. The whole procedure of creating a backup image and restoring that image in a bare-metal recovery process is quite complex.

At the same time, data stored in the EFI partition is critical during boot of the Microsoft® Windows® Server® 2008 operating system. Without protecting the partition, bare-metal disaster recovery for an IA64 Microsoft® Windows® Server® 2008 operating system cannot be achieved.

The EFI partition includes data defining a software interface between the Microsoft® Windows® Server® 2008 operating system and platform firmware. The EFI includes data tables that contain platform information and boot and runtime services that are available to the Microsoft® Windows® Server® 2008 operating system loader and the operating system. In a bare-metal recovery process, most of the contents of the EFI partition are consistent across Microsoft® Windows® Server® 2008 operating system installations. These consistent contents can be obtained in the Microsoft® Windows® Server® 2008 operating system recovery environment, such as by copying the content from a Microsoft® Windows® Server® 2008 operating system installation optical disk, hard disk, or other medium from which the Microsoft® Windows® Server 2008 operating system may be installed or recovered. However, a file or files referred to as Boot Configuration Data file (BCD), which is held in the EFI partition includes data that can differ between Microsoft® Windows® Server® 2008 operating system installations. Thus, to perform a complete bare-metal disaster recovery of a Microsoft® Windows® Server® 2008 operating system on an IA64 platform, data of the BCD is obtained from the particular system to be backed up.

The BCD includes at least one file that provides a store that is used to describe boot applications and boot application settings. While the Microsoft® Windows® Server® 2008 operating system is running, a command-line tool BCDEdit is used to export the content of the BCD into a file. However, in some embodiments, the file may be created via calls to an Application Programming Interface to obtain the BCD. This file is usually less than 100 kilobytes and does not impose overhead in terms of time, storage space, or complexity for backup and recovery. The BCD file, once created, can be used later to restore the state of the system. However, if the BCD file exported though the BCDEdit tool is copied to a newly formatted EFI partition on a target recovery system, the target recovery system cannot boot. Thus, the following describes methods and mechanisms that may be implemented to successfully backup and restore Microsoft® Windows® Server 2008 operating system machines in bare-metal disaster recovery scenarios.

A bare-metal disaster recovery is a process for recovery and restoration where backed up data is available in a form to allow restoration of a computer system without any requirements as to previously installed software or operating systems. The backed up data typically includes operating system, application, and data components to rebuild or restore a computer to a state at a time when the backed up data was copied. Thus, the term "bare-metal" as commonly used refers to computer system hardware as the "metal" and "bare" meaning that there is no software or data on the computer or that the data and software on the computer is of no concern in the recovery process.

FIG. 1 is a block diagram of a computing device according to an example embodiment. In one embodiment, multiple such computer systems are utilized in a distributed network to implement multiple components in a transaction-based environment. Thus, the computing device of FIG. 1 may be implemented as a server computer, a client computer, or a computer that performs one or more functions of both client and server computers.

An object-oriented architecture may be used to implement such functions and communicate between the multiple systems and components. One example-computing device in the form of a computer 110, may include at least one processing unit 102, memory 104, removable storage 112, and non-removable storage 114. Memory 104 may include volatile memory 106 and non-volatile memory 108. Computer 110 may include—or have access to a computing environment that includes—a variety of computer-readable storage mediums, such as volatile memory 106 and non-volatile memory 108, removable storage 112, and non-removable storage 114. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The computer storage may also include a hard disk, also referred to as a hard drive, that may be partitioned. The partitions may include an EFI partition that stores the BCD. Computer 110 may include or have access to a computing environment that includes input 116, output 118, and a communication connection 120. The computer may operate in a networked environment using a communication connection to connect to one or more remote computers, such as database servers and application servers. The remote computer may include a personal computer (PC), server, router, network PC, a peer device or other common network node, or the like. The communication connection may include a connection via a network interface device to one or more of a Local Area Network (LAN), a Wide Area Network (WAN), the Internet, and other networks.

Computer-readable instructions stored on a computer-readable storage medium are executable by the at least one processing unit 702 of the computer 710. A hard drive, CD-ROM, and RAM are some examples of articles including a computer-readable storage medium. For example, a computer program 725 may be stored on one or more computer-readable storage mediums. The computer program may include instructions executable by the at least one processing unit 702 to perform one or more of the methods and provide the functionality as described herein. The computer program 725 may also include an operating system, such as a Microsoft® Windows® operating system. The Microsoft® Windows® operating system can be the Microsoft® Windows® Server® 2008 operating system, the Microsoft® Windows® Vista® operating system, or other operating system that includes a similar architecture.

Figure 2:
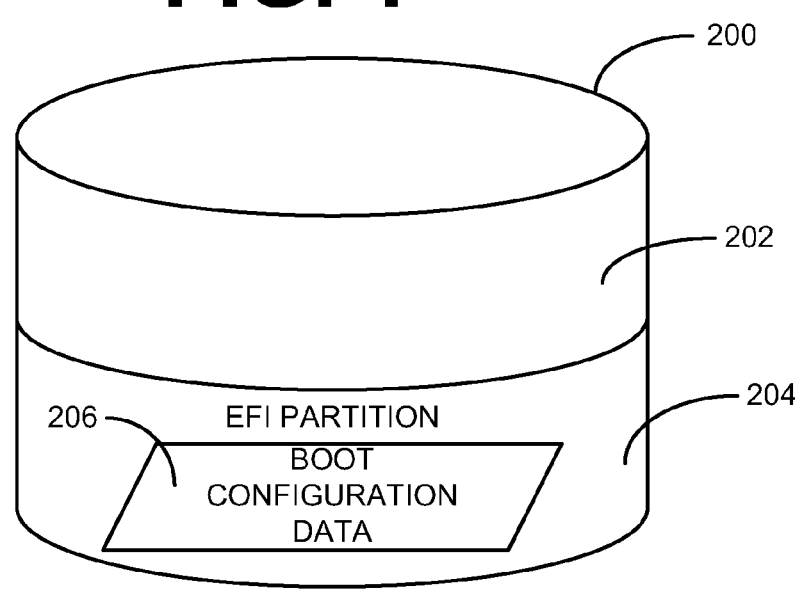
FIG. 2 is a block diagram of a hard disk including an Extensible Firmware Interface (EFI) partition storing Boot Configuration Data (BCD) according to an example embodiment.

FIG. 2 is a block diagram of a hard disk 200 including an EFI partition 204 storing BCD 206 according to an example embodiment. The BCD 206 is caused by various operating systems to be stored as one or more files in the EFI partition 204 of the hard disk 200. At boot time of the computer within which the hard disk 200 is installed, the BCD 206 is read and used to assist in booting the computer along with other data that may be stored in another partition 202 of the hard disk that stores other operating system and application components and data. Data stored in the EFI partition 204, such as the BCD 206, is typically not accessible from the EFI partition 204. The EFI partition 204 is typically about 100 megabytes in size. However, the size of the EFI partition 204 may vary. In some instances, it may be possible for the EFI partition 204 to be a separate hard disk depending on the specific requirements and allowable configuration settings of the particular operating system of the computer within which the hard disk 200 is installed.

Figure 3:
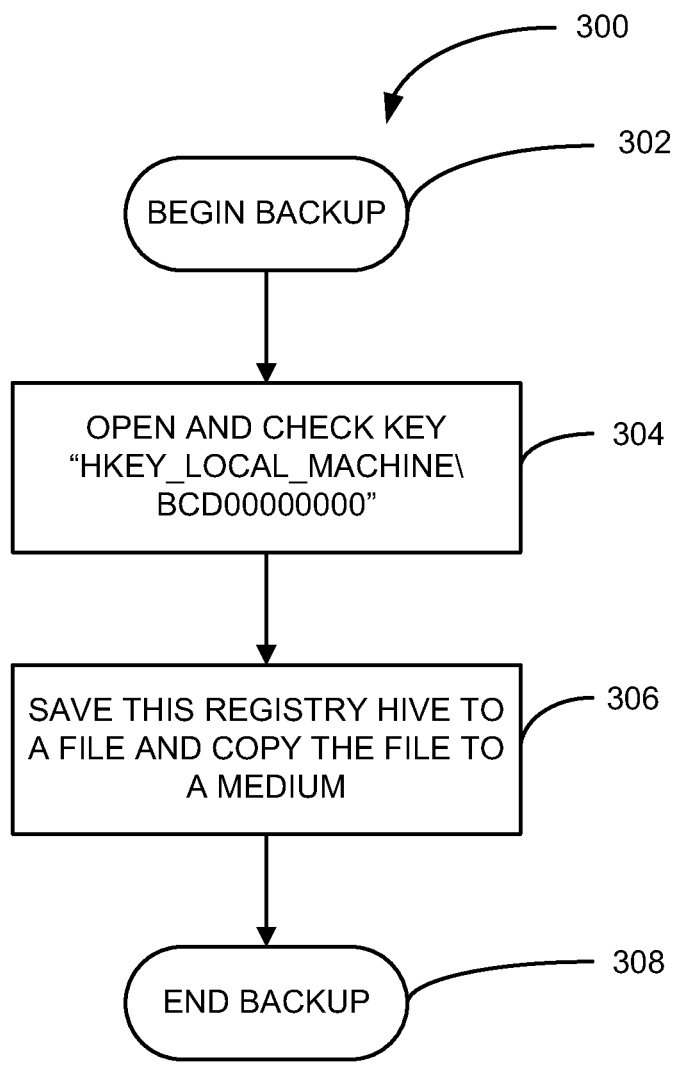
FIG. 3 is a block flow diagram of a method according to an example embodiment.

FIG. 3 is a block flow diagram of a method 300 according to an example embodiment. The method 300 is an example of a method to backup BCD of a system, such as a system under control of the Microsoft® Windows® Server® 2008 operating system. The method 300 includes beginning the backup 302 of the system by opening a system registry and checking for a registry hive with a key of "HKEY_LOCAL_MACHINE\BCD0000000X" where X is a number zero (0) through nine (9). The checking may further include checking whether there is a sub-key "Description" having one parameter "KeyName" equal to "BCD0000000X" with X being the same number zero (0) to nine (9) as above. The checking may also include checking whether there are parameters "System" and "TreatAsSystem" in the sub-key "Description." This additional checking may be performed in instances when there are multiple sets of BCD. This checking is performed to ensure the currently implemented BCD is identified in the Registry.

Once the proper BCD is identified and opened in the registry, the method 300 includes copying and saving 306 the registry hive to a file and copying the file to a storage medium. This file including the BCD may be stored to a hard disk, an optical medium such as a DVD or CD, or other medium. In some instances, the file including the BCD is stored on a medium with other disaster recovery data copied from the computer that the method 300 is executing against. The other disaster recovery data may include files and data of applications installed on the computer and as generated by a user or is otherwise stored on the computer. The backup of the method 300 then ends.

Figure 4:
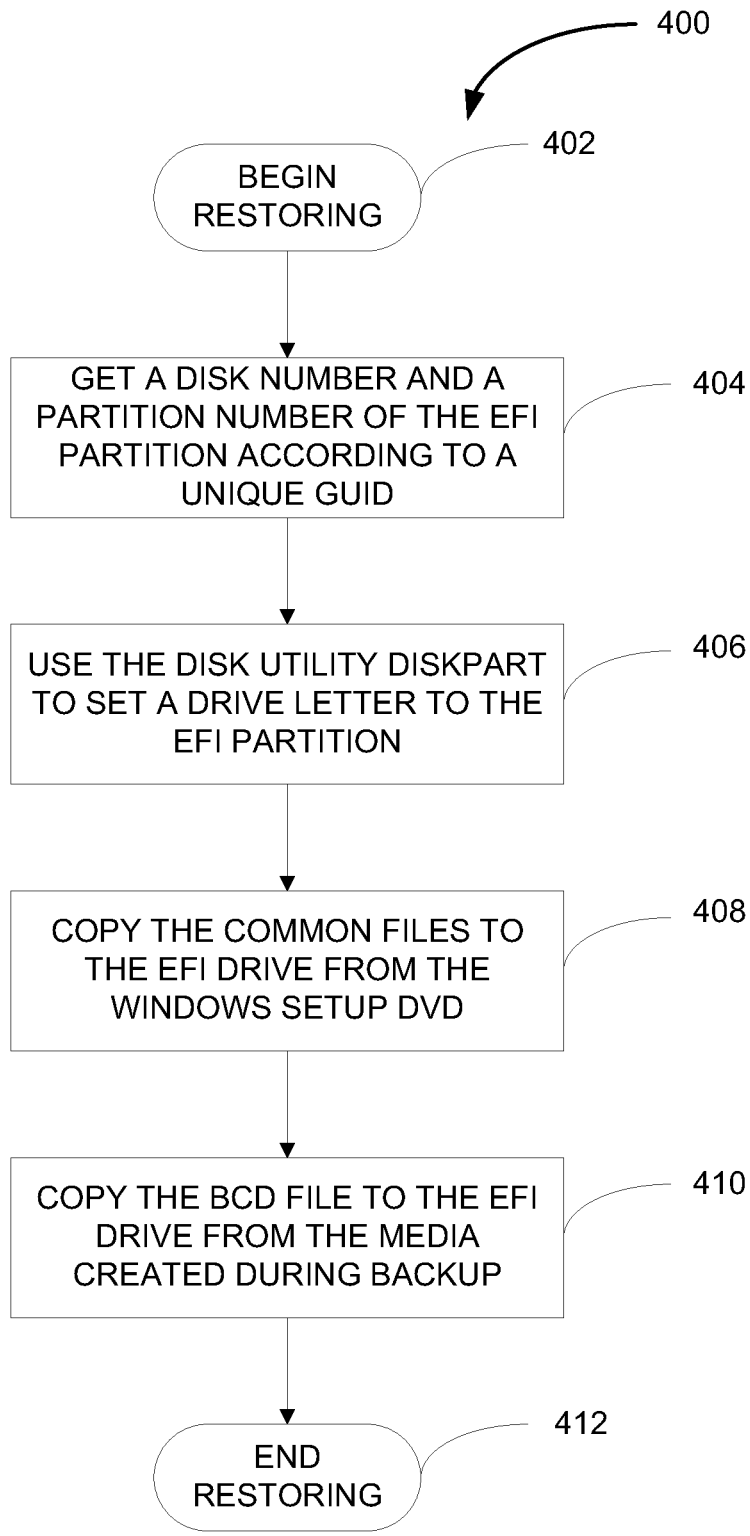
FIG. 4 is a block flow diagram of a method according to an example embodiment.

FIG. 4 is a block flow diagram of a method 400 according to an example embodiment. The method 400 is an example embodiment of performing a bare-metal restoration of a system backed up according to the method 300 of FIG. 3. The method begins the restoring 402 by getting 404 a disk number and partition number of the EFI partition according to a unique Globally Unique Identifier (GUID) of the EFI partition. In some instances, the EFI partition may not yet exist. In such instances, operating system recovery or pre-installation processes may first be executed to establish the EFI partition. For example, the Microsoft® Windows® Server 2008 or Microsoft® Windows® Vista® operating system recovery or pre-installation processes may be called to execute on the computer being recovered and those processes will create or reestablish the EFI partition.

The method 400 continues by using a disk utility, such as DISKPART, to set 406 a drive letter for the EFI partition to make the EFI partition accessible by processes other than pre-boot and boot processes. Data and files in the EFI that are common amongst all installations of the operating system being restored on the computer are copied 408 to the EFI drive. This data and these files may be copied from an operating system setup disk, a backup image of the computer being restored, from within a recovery or preinstallation environment of the operating system, or other location where the data and files may be stored. One other location may be a network location accessible over a network via a network interface device of the computer being restored. Further, the BCD file, or at least the BCD data from the BCD file, is copied 410 to the EFI drive, such as may be created according to the method 300 of FIG. 3. Further data may also be copied to the computer being restored, such as application files, data, configuration data, user data, and other data that may have been stored on the computer at a time when a backup image was generated. The method 400 then ends 412 and the computer may be rebooted to complete the recovery process. In some embodiments, the drive letter is set 406 for the EFI partition in a manner whereby the drive letter is temporary and disappears when the computer is rebooted. However, in other embodiments, the method 400 further includes unassigning the drive letter of the EFI partition.

Figure 5:
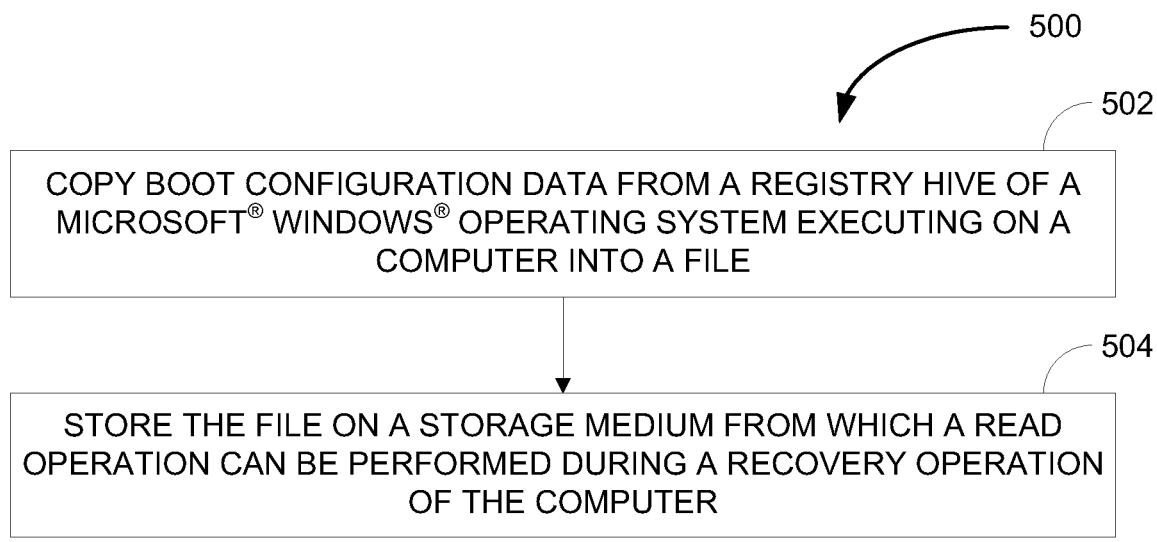
FIG. 5 is a block flow diagram of a method according to an example embodiment.

FIG. 5 is a block flow diagram of a method 500 according to an example embodiment. The method 500 is another example of a method that may be performed to generate a backup of BCD held in an EFI partition that is not accessible on computer once the operating system is running. The method 500 includes copying 502 BCD from a registry hive of a Microsoft® Windows® operating system executing on a computer into a file and storing 504 the file on a storage medium from which a read operation can be performed during a recovery operation of the computer. Some embodiments may further include copying other data, such as application files and application data, from data storage devices of the computer and storing the other data on a storage medium from which a read operation can be performed during a recovery operation of the computer. In some such embodiments, the storage medium storing the file including the BCD and the storage medium storing the other data are the same storage medium. In other embodiments, the storage mediums are distinct.

Figure 6:
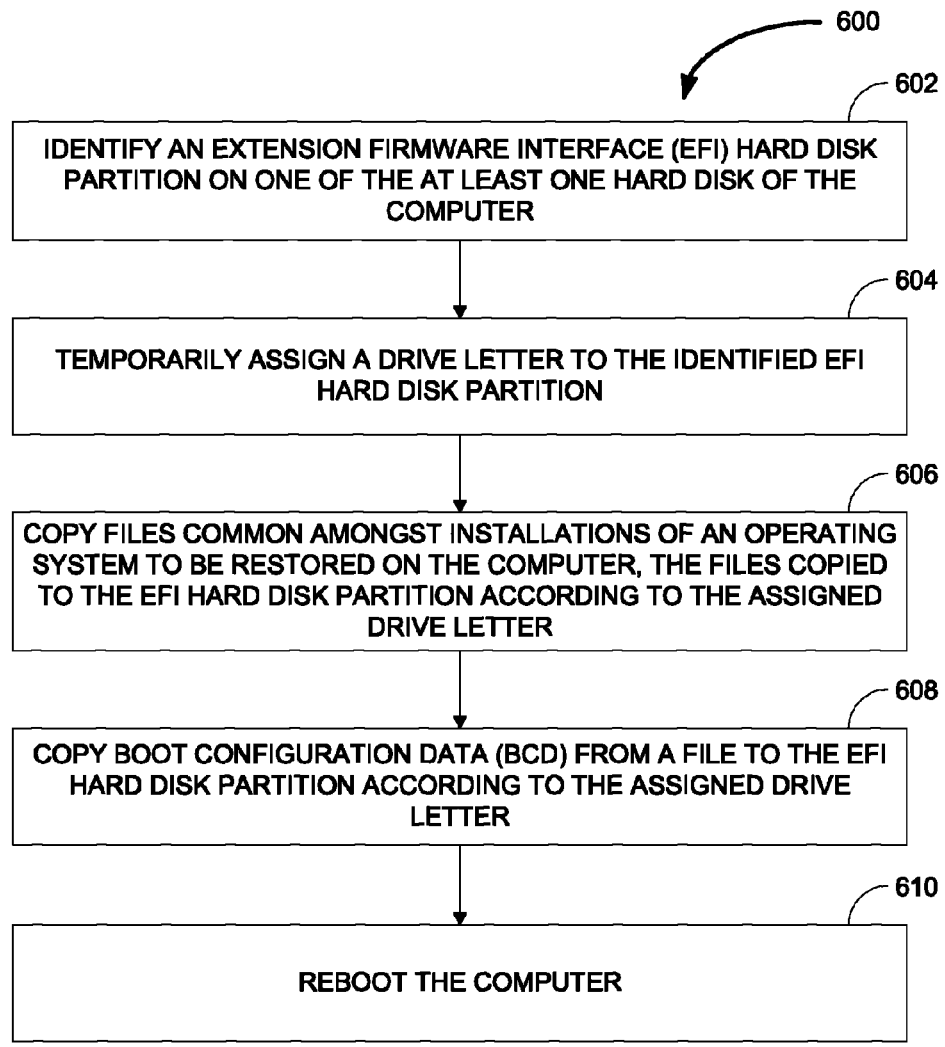
FIG. 6 is a block flow diagram of a method according to an example embodiment.

FIG. 6 is a block flow diagram of a method 600 according to an example embodiment. The method 600 is a method to be performed by a target computer to be restored based in part on a file including BCD data, such as a file as generated by the method 300 of FIG. 3 or method 500 of FIG. 5. The method 600 includes identifying 602 an EFI hard disk partition of the target computer and temporarily assigning 604 a drive letter to the identified EFI hard disk partition. The method 600 then copies data to the EFI hard disk partition according to the assigned drive letter, such as by copying 606 files common amongst installations of an operating system to be restored on the target computer and copying 608 BCD from a file. The file the BCD is copied from is a file that is generated form a source computer to be restored on the target computer, such as a file generated according to the method 300 of FIG. 3 or the method 500 of FIG. 5. The method 600 further includes rebooting 610 the target computer.

Another embodiment is in the form of a system. The system includes at least one processor, at least one memory device, at least one hard disk, a video output device, and at least one input device interconnected via at least one integrated circuit board. The system also includes a system restore application stored on a computer-readable medium readable by a data reading device of the system, the application including instructions executable by the at least one processor. The instructions that are executable by the processor may include instructions to perform one or more of the methods described above to backup portions of computers, such as for bare-metal recovery, including BCD held in an EFI.

Numerous specific details are set forth herein to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter. Some portions of the description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, considered a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this description, discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Thus, the functions or algorithms described herein are implemented in hardware, software, or a combination of software and hardware in one embodiment. The software comprises computer executable instructions stored on computer-readable media such as memory or other type of storage devices. Further, described functions, methods, and elements thereof may correspond to modules, which may be software, hardware, firmware, or any combination thereof. Multiple functions are performed in one or more modules as desired, and the embodiments described are merely examples. For example, the methods 300, 400, 500, and 600 of FIG. 3, FIG. 4, FIG. 5, and FIG. 6, respectively, may include one or more modules that operate in conjunction with one another to implement one or more of these methods in a system.

The software, which may be in the form of a software module, is executed on a digital signal processor, application specific integrated circuit (ASIC), microprocessor, or other type of processor operating on a system, such as a personal computer, server, a router, or other device capable of processing data including network interconnection devices. Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
   verifying a Boot Configuration Data (BCD) is a proper BCD by determining if a sub-key of the registry hive includes a specific parameter;

copying the BCD from a registry hive of an operating system executing on a computer into a file, wherein the registry hive is one of a plurality of registry hives;

storing the file on a removable storage medium from which a read operation can be performed during a recovery operation of the computer; and performing a bare-metal restore at boot of the computer as a function of the file including the BCD, performance of the restore including:

creating an Extension Firmware Interface (EFI) partition when the EFI partition does not exist;

obtaining a disk number and partition number of the EFI partition of the computer;

assigning a drive letter to the EFI hard disk partition;

copying files common amongst installations of the operating system from an operating system install disk to the EFI hard disk partition according to the assigned drive letter;

copying the BCD from the file on the removable storage medium to the EFI hard disk partition according to the assigned drive letter;

unassigning the drive letter from the EFI hard disk partition; and rebooting the computer.

2. The method of claim 1, wherein the registry hive from which the BCD is copied includes a registry hive with a key of "HKEY_LOCAL_MACH1NE\BCD0000000X" where X is one of the numbers zero (0) to nine (9).

3. The method of claim 1, wherein the storage medium is an optical disk.

4. The method of claim 1, further comprising:

copying other data from data storage devices of the computer; and storing the other data on a storage medium from which a read operation can be performed during a recovery operation of the computer.

5. The method of claim 4, wherein the storage medium storing the file including the BCD and the storage medium storing the other data are the same storage medium.

6. The method of claim 4, wherein the other data includes files of one or more applications installed on the computer.

7. A method comprising:

verifying a Boot Configuration Data (BCD) is a proper BCD by determining if a sub-key of a registry hive of a plurality of registry hives of an operating system includes a specific parameter, the operating system executing on a computer;

storing the BCD from the registry hive of the operating system onto a removable storage medium from which a read operation can be performed during a recovery operation of the computer; and performing a bare-metal restore at boot of the computer, performance of the restore including:

creating an Extension Firmware Interface (EFI) partition when the EFI partition does not exist;

obtaining a disk number and hard disk partition number of the EFI partition of a target computer to be restored;

assigning a drive letter to the EFI hard disk partition;

copying files common amongst installations of an operating system to be restored on the target computer, the files copied from an operating system install disk to the EFI hard disk partition according to the assigned drive letter;

copying Boot Configuration Data (BCD) from the removable storage medium to the EFI hard disk partition according to the assigned drive letter;

unassigning the drive letter from the EFI hard disk partition; and rebooting the target computer.

8. The method of claim 7, wherein obtaining the disk and hard disk partition number of the EFI partition includes retrieving a Globally Unique Identifier (GUID) of the EFI hard disk partition.

9. The method of claim 7, further comprising:

prior to the unassigning of the drive letter from the EFI hard disk partition and the rebooting of the target computer, copying other data from a storage medium storing data backed up from a source computer from which the BCD was copied; and storing the copied data to a hard disk partition other than the EFI hard disk partition.

10. The method of claim 9, wherein the other data includes:

files of one or more applications installed on the source computer to be restored on the target computer.

11. The method of claim 7, wherein the file holding the BCD copied to the EFI hard disk partition is created on a source computer according to a process comprising:

copying Boot Configuration Data (BCD) from a registry hive of an operating system executing on the source computer, the BCD copied into a file;

storing the file on a storage medium from which a read operation can be performed during a recovery operation of the target computer.

12. The method of claim 11, wherein the registry hive from which the BCD is copied includes a registry hive with a key of "HKEY_LOCAL_MACH1NE\BCD0000000X" where X is a number between zero (0) and nine (9).

13. The method of claim 11, wherein the storage medium is a data storage device accessible over a network via network interface devices of both the source and the target computers.

14. A non-transitory computer-readable medium, with instructions stored thereon, which when executed by a processor of a target computer to be restored, cause the target computer to:

verify a Boot Configuration Data (BCD) is a proper BCD by determining if a sub-key of a registry hive of a plurality of registry hives of an operating system includes a specific parameter, the operating system executing on a computer store the BCD from the registry hive of the operating system onto a removable storage medium from which a read operation can be performed during a recovery operation of the computer; and perform a bare-metal restore at boot of the computer, performance of the restore including:

create an Extension Firmware Interface (EFI) partition when the EFI partition does not exist;

identify an Extension Firmware Interface (EFI) hard disk partition of the target computer;

temporarily assign a drive letter to the identified EFI hard disk partition;

copy files common amongst installations of an operating system to be restored on the target computer, the files copied from an operating system install disk to the EFI hard disk partition according to the assigned drive letter;

copy Boot Configuration Data (BCD) from the removable storage medium to the EFI hard disk partition according to the assigned drive letter; and reboot the target computer.

15. The non-transitory computer-readable medium of claim 14, with further instructions executable by the processor of the target computer to:

prior to rebooting of the target computer, copy other data from a storage medium storing data backed up from a source computer from which the BCD was copied; and store the copied data to a hard disk partition of the target computer other than the EFI hard disk partition.

16. A system comprising:

at least one processor, at least one memory device, at least one hard disk, a video output device, and at least one input device interconnected via at least one integrated circuit board; and a system restore application stored on a computer-readable storage medium readable by a data reading device of the system, the application including instructions executable by the at least one processor to:

verify a Boot Configuration Data (BCD) is a proper BCD by determining if a sub-key of a registry hive of a plurality of registry hives of an operating system includes a specific parameter, the operating system executing on a computer;

store the BCD from the registry hive of the operating system onto a removable storage medium from which a read operation can be performed during a recovery operation of the computer; and perform a bare-metal restore at boot of the computer, performance of the restore including:

create an Extension Firmware Interface (EFI) partition when the EFI partition does not exist;

identify an Extension Firmware Interface (EFI) hard disk partition on one of the at least one hard disk of the system;

temporarily assign a drive letter to the identified EFI hard disk partition;

copy files common amongst installations of an operating system to be restored on the system, the files copied from an operating system install disk to the EFI hard disk partition according to the assigned drive letter;

copy Boot Configuration Data (BCD) from the removable storage medium to the EFI hard disk partition according to the assigned drive letter; and reboot the system.

17. The system of claim 16, wherein the operating system is a Microsoft® Windows® operating system.

18. The system of claim 17, wherein identifying the EFI hard disk partition includes obtaining a disk number and hard disk partition number of EFI hard disk partition via an operating system BCD_Edit application programming interface call to retrieve a Globally Unique Identifier (GUID) of the EFI hard disk partition.

19. The system of claim 16, wherein the system restore application is further executable by the at least one processor to:

prior to rebooting of the target computer, copy other data from a storage medium storing data backed up from a source computer from which the BCD was copied; and store the copied data to a hard disk partition of the target computer other than the EFI hard disk partition.

* * * * *